Patented Oct. 20, 1942

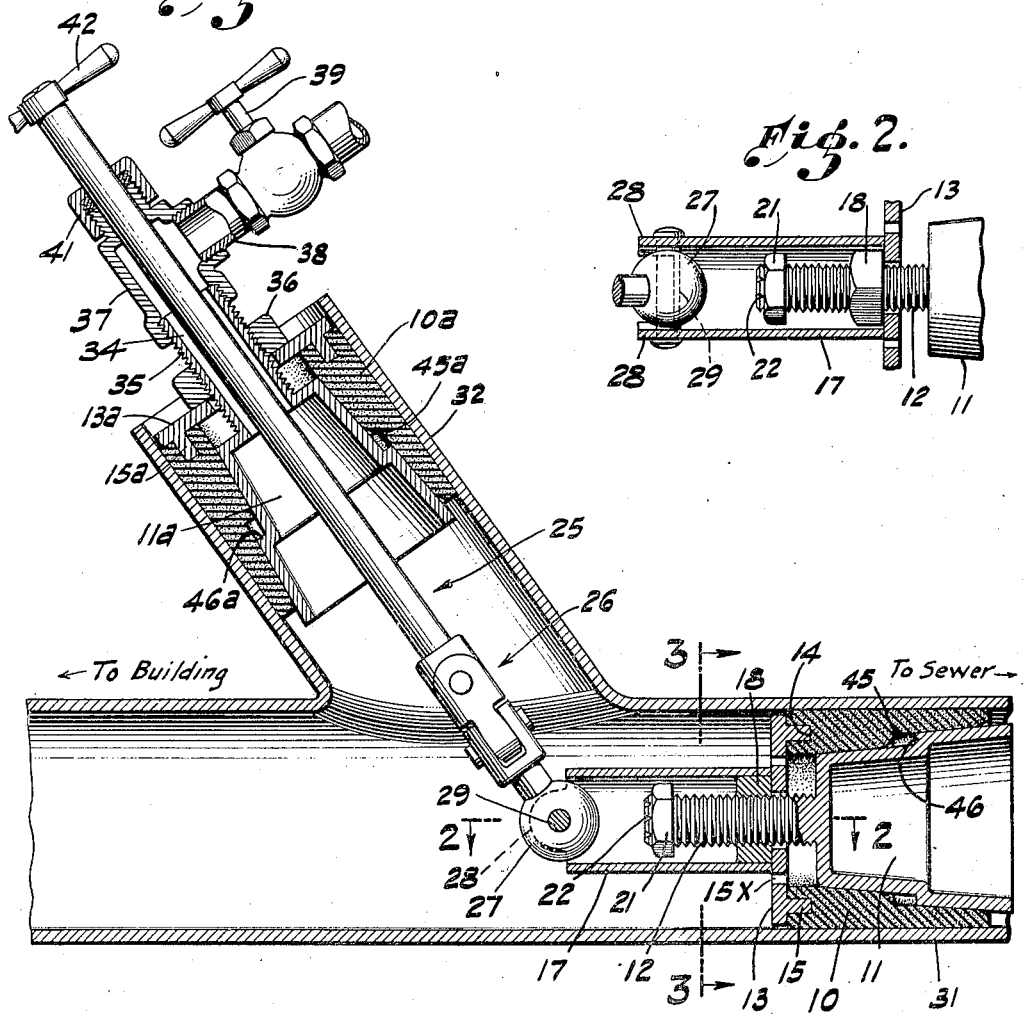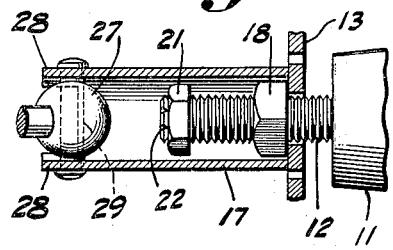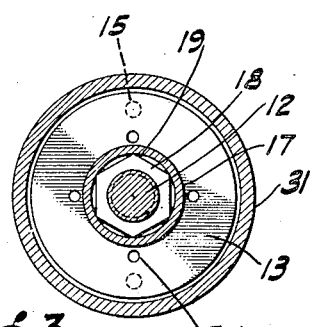

2,299,434

UNITED STATES PATENT OFFICE 2,299,434

PLUMBER'S PIPE TESTING DEVICE

Bennett Svirsky, Glendale, Calif.

Application May 5, 1941, Serial No. 391,892

9 Claims. (Cl. 138—90)

The present invention relates to a modified form of the devices described in my copending application filed February 11, 1941, Serial No. 378,381, and my companion applications of even date, Ser. No. 391,891 and Ser. No. 391,893, filed May 5, 1941.

In the present application a plurality of elastic tubular bodies are provided which are expanded by mechanical force applied internally in such a manner that a uniform expansion occurs in substantially all portions of the length of each tubular body used, thereby producing a superior water-tight seal between the exterior of each body and the internal surface of the pipe within which it is temporarily installed.

In addition to the foregoing object, another object of the invention is to provide for the manipulation of one of the pipe obstructing units in such a manner as to allow the body of liquid used thereabove to test the plumbing system, to flow therepast more quickly into the sewer, both through and around the tubular, expansible part of such unit.

Still another object of the invention is to provide an improved means for bringing about the cooperative action of two expansible bodies for closing up different parts of a sewer pipe structure, whereby each of said bodies may be sufficiently expanded to form a fluid tight plug in the pipe, without the expanding operation of one body in any manner interfering with that of the other.

Yet another object of the invention is to provide for utilizing a universal joint structure in a combined means for connecting together two stopper forming expansible bodies in a spaced apart relation to each other in a section of sewer pipe, and to form an operating means to expand and contract, as well as to properly position, the more remote of the two bodies when they are disposed in an angular relation to each other, and also forming a part of the means whereby the more remote body may be withdrawn from its operative position around a bend or turn in the conduit in which it is temporarily installed for making the leak-proof test required.

Other objects, advantages, and features of invention will hereinafter appear.

Referring to the accompanying drawing, which illustrate what is at present deemed to be a preferred embodiment of the invention, Fig. 1 is a view mainly in longitudinal mid-section showing the device installed in its operative position within a branched section of soil pipe, one of the expansible bodies being positioned within the body portion of the pipe and the other within the branch thereof.

Fig. 2 is a detail, partly in elevation and partly sectioned on line 2—2 of Fig. 1.

Fig. 3 is a cross section taken on line 3—3 of Fig. 1.

Referring in detail to the accompanying drawing, which illustrates what is at present deemed to be a preferred embodiment of the invention, the main parts of the lower unit of the device, as shown in its installed position in Fig. 1, are the body 10 of a generally cylindrical shape composed of a rubber-like expansible material having its interior wall conically tapered in a stepped manner toward its left end throughout its length, and a frusto-conical follower 11, the taper of which is stepped to correspond with the taper of said wall, said follower being furnished at its smaller end with an axially projecting screw threaded stem 12. An abutment plate 13 is shown mounted upon the left end of the body 10, that is to say, the end of said body having the smaller internal diameter. Said body is provided with a plurality of recesses 14 and said plate 13 is furnished with a like number of correspondingly arranged lugs or projections 15 which enter said recesses and thus anchor the plate to the elastic body.

Means are provided to apply a tractive force to the follower 11 to cause it to expand the body 10, said means including a cup-shaped member 17 having a thickened bottom portion 18 which is in a screw-threaded relation to the stem 12. The thickened part 18 of said cup bottom may consist of a hexagonal nut fitted within the end of said sleeve and secured thereto by means of welds 19. The outer end of the stem 12 is shown provided with a head 21. By preference and as shown, said head consists of a nut, it being necessary to apply the head to the stem after the latter has been projected through the bottom portion of the cup. After said nut has been applied to the stem the threads at the outer end of the stem may be battered as indicated at 22 in order to prevent said nut from becoming detached, thereby safeguarding against the follower becoming detached from the lower unit and being carried down into the sewer.

The means for applying traction to the stem 12 of the follower includes a shaft structure 25 furnished at its inner end with a universal joint structure 26, said joint structure including at its extreme lower end of a spherical member 27. The adjacent end portion of the sleeve part 17 of the cup-shaped member is furnished with diametrically opposite ears 28 between which said spherical part 27 is positioned, and a substantial pivot pin 29 carried by and bridging the space between said ears passes diametrically through said spherical part 27. The universal joint connection between the cup member 17 and the shaft 25 makes it possible to position said shaft at an angle to the axis of said cup-shaped member. When the elastic body 10 is located within the body portion 31 of the sewer pipe which has the angularly extending branch 32, the shaft 25 extends axially through said branch.

In order to plug up the branch 32 of the sewer pipe at the same time the body portion thereof is closed by the elastic body 10 which has been described, the main parts of the plug structure shown in the right hand portion of Fig. 1 are reproduced in the upper part of the sewer pipe branch 32, hence will not be again described in detail but will be readily understood by reason of being lettered in the same manner except for the addition of the letter a to each reference number.

The follower 11a, shown in the upper portion of Fig. 1, differs from the follower 11 in that it is provided with a tubular stem 35. Said stem is externally screw threaded and traction is applied thereto by rotating the nut 36 by means of a suitable tool. Onto the tubular stem 35 is screwed a T fitting 37 which is furnished with a water intake branch 38 controlled by a shut-off valve 39. This T fitting is furnished with a stuffing box structure 41 through which the outer end portion of the shaft 25 projects in a rotational, slidable, fluid tight manner. The outer end of said shaft is shown furnished with a detachable handle consisting of a cross bar 42, so that it may conveniently be manually rotated.

Describing more in detail the structure of the cylindrical elastic bodies 10 and 10a together with the followers 11 and 11a whereby said bodies are expanded, each of these bodies is shown furnished at about its mid-length with an internal shoulder 45 located at the point where its two tapered internal surfaces meet. Each follower is likewise furnished with an annular shoulder 46, the shoulder of each follower being so related to the shoulder of the tubular body with which it cooperates that the shoulder of the follower will abut against the shoulder of the rubber body before the small end of the follower comes in contact with the adjacent face of the abutment plate 13 (or 13a). When the annular shoulder of the followers (11 and 11a) abut against the annular shoulders (45 and 45a) of the expansible members which surround them, said members are additionally expanded. By this structure each of the tubular expansible members is provided with internal expansion means whereby it is expanded in a virtually uniform manner throughout all portions of its length. This is deemed to be an important feature of the invention as it provides a more extended and efficient water tight seating surface between each expansible member and the section of pipe with which it cooperates to form a liquid-tight seal.

The abutment plate 13 is shown provided with a plurality of liquid admission passages 15x which lead through the plate outside of the space included within the bottom portion of the cup-shaped member 17, but said passages are located sufficiently near to the axis of this part of the structure to conduct water pressure into the adjacent end portion of the rubber body 10. The water pressure thus admitted presses against the small end of the follower 11 and thus aids the operator in shifting the follower 11 rightward from the position shown in Fig. 1. To do this he will rotate the shaft 25 in the proper direction to cause the nut 18 to advance the follower in the direction stated. The water will then flow back into the sewer both through the holes 15x and around the contracted tubular body 10.

The plug structure shown in the upper left hand portion of Fig. 1 is not provided with any fluid admission passages through its abutment plate 13a, but an annular clearance 34 is provided between the shaft 25 and the interior wall of the stem 35, and the plumber may supply a stream of water, controlled by the valve 39, through said annular clearance to the interior of the sewer pipe to test for leaks the plumbing of which said sewer pipe forms a part.

The universal joint connection provided between the shaft 25 and the traction member 17 of the plug structure shown in the lower left hand portion of Fig. 1, enables said plug structure, when its elastic portion is contracted, to be withdrawn bodily from the pipe portion 31 through the branch 32, it being understood that the nut 36 of the upper plug structure will have been previously loosened sufficiently to allow the latter plug structure also to contract preparatory to being withdrawn from the pipe in advance of the plug structure located in the body portion of the sewer pipe. It is necessary to contract the lower plug first in order to permit the water to flow to the sewer in advance of contracting the upper plug and then withdrawing the device as a whole from the piping system.

The shaft 25 and universal joint structure associated therewith possesses sufficient rigidity to enable the operator to adjust the lower unit longitudinally of the horizontal pipe as desired.

It should be understood that the present disclosure is for the purpose of illustration only and that this invention includes all modifications and equivalents which fall within the scope of the subject matter claimed.

What is claimed is:

1. In a plumber's pipe testing device, a body of a generally cylindrical shape composed of a rubber-like expansible material having its interior wall conically tapered in a stepped manner toward one end throughout its length; an abutment plate anchored to the last recited end of said body, a frusto-conical follower, the taper of which is stepped to correspond with the taper of said wall, said body being furnished with an internal annular shoulder where its two internal surfaces meet and said follower being likewise furnished with an annular shoulder, the shoulder of said follower being so related to the shoulder of said body with which it cooperates that the shoulder of the follower will abut against the shoulder of the body before the small end of the follower comes in contact with the adjacent face of said abutment plate; said follower being furnished at its smaller end with an axially projecting stem, extending through an aperture in said abutment plate; the smaller end of said follower being slightly greater in diameter than the internal diameter of the smaller end portion of said tubular body; and means for applying traction to said stem in relation to said body while at least a portion of said follower is contained therein, to cause said follower to expand the rubber-like portion of the structure.

2. In a plumber's pipe testing device, a body of a generally cylindrical shape composed of a rubber-like expansible material having its interior wall conically tapered in a stepped manner toward one end throughout its length, a frusto-conical follower, the taper of which is stepped to correspond with the taper of said wall, said follower being furnished at its smaller end with an axially projecting screw-threaded stem, the smaller end of said follower being slightly greater in diameter than the internal diameter of the smaller end portion of said tubular body, at least a portion of said follower being contained within said body while a part of said stem projects axially from the end of said body having the smaller diameter, an abutment plate anchored to the last recited end of said body, said plate having through it a central aperture through which said stem loosely projects, a cup-shaped member surrounding the projecting portion of said stem and having its bottom portion in a screwthreaded relation to the threads of said stem and in an abutting relation to said abutment plate, and means to rotate said cup-shaped member to apply traction to said stem.

3. The subject matter of claim 2 and, said abutment plate having through it apertures located radially outward from said cup-shaped member and positioned to admit liquid under pressure to the smaller end of said follower around the stem thereof.

4. In a plumber's pipe testing device, a body of a generally cylindrical shape composed of a rubber-like expansible material having in relation to its length two internal conically tapered portions which meet each other along an internal annular shoulder, the taper being in the same direction throughout both of said portions, a follower having frusto-conical portions likewise dimensioned and shaped to exert an internal wedging action upon said cylindrically shaped body, said follower also having an annular shoulder between two frusto-conical surface portions, and means for applying traction to said follower in relation to said body to expand the latter into a fluid tight relation to the interior surface of a conduit, the shoulder of said follower being so related to the shoulder of said body with which it cooperates that the shoulder of the follower will abut against the shoulder of the body before the small end of the follower comes into registry with the open end of said body which it approaches.

5. In a plumber's pipe testing device, two units each having a body of a generally cylindrical shape composed of a rubber-like material having their interior walls conically tapered in a stepped manner toward one end throughout their length to form a temporary closure in a sewer pipe, each of said bodies being provided with an internal follower, there being for the purpose of expansion, stepped, cooperating beveled surfaces between each follower and the peripheral portion of the body with which it cooperates, the follower of one of said bodies being furnished at its smaller end with an axially projecting screwthreaded stem, the smaller end of said follower being slightly greater in diameter than the internal diameter of the smaller end portion of its said cylindrical body, at least a portion of the latter follower being contained within its associated body while a part of said stem projects axially from the end thereof having the smaller diameter, an abutment plate anchored to the last recited end of the follower last mentioned, said plate having through it a central aperture through which said stem loosely projects, a cup-shaped member surrounding the projecting portion of said stem and having its bottom portion in a screwthreaded relation to the threads of said stem and in an abutting relation to said abutment plate, a shaft extending in a fluid tight manner through the follower of the other body and being manually rotatable and slidable in relation thereto, and means to operatively connect said shaft and said cup-shaped member to apply traction to said stem to advance and retract its follower.

6. The subject matter of claim 5 and, the body through which said shaft extends having its aforesaid follower furnished with a tubular operating stem which surrounds a portion of said shaft in a concentric, outwardly spaced relation thereto thus providing a water inlet passage leading through that body, and means connected to the latter stem to conduct water to said passage, said water conducting means including a stuffing-box structure through which said shaft projects.

7. In a plumber's pipe testing device, a body of a generally cylindrical shape composed of a rubber-like expansible material having its interior wall conically tapered in a stepped manner toward one end, a frusto-conical follower, the taper of which is stepped to correspond with the taper of said wall, said follower being furnished at its smaller end with an axially projecting screw-threaded stem, at least a portion of said follower being contained within said body while a part of said stem projects axially from the end of said body having the smaller diameter, an abutment plate anchored to the last recited end of said body, said plate having through it a central aperture through which said stem projects, a traction member embracing the projecting portion of said stem in an abutting relation to said abutment plate and having a screwthreaded portion in an operative relation to the threads of said stem, and means for rotating said member to apply traction to said stem.

8. In a plumber's pipe testing device, a body of a generally cylindrical shape composed of a rubber-like expansible material having its interior wall conically tapered toward one end, a frusto-conical follower, the taper of which corresponds with the taper of said wall, said follower being furnished at its smaller end with an axially projecting screw-threaded stem, at least a portion of said follower being contained within said body while a part of said stem projects axially from the end of said body having the smaller diameter, an abutment plate anchored to the last recited end of said body, said plate having through it a central aperture through which said stem projects, a member embracing the projecting portion of said stem and having its bottom portion in a screw-threaded relation to the threads of said stem and in an abutting relation to said abutment plate, and means to rotate said member to apply traction to said stem.

9. The subject matter of claim 8 and, said abutment plate having through it an aperture located outwardly from said member and positioned to admit liquid under pressure to the smaller end of said follower around the stem thereof.

BENNETT SVIRSKY.